US007956802B1

(12) United States Patent
Hwang et al.

(10) Patent No.: US 7,956,802 B1
(45) Date of Patent: Jun. 7, 2011

(54) INTEGRITY-OPTIMIZED RECEIVER AUTONOMOUS INTEGRITY MONITORING (RAIM) FOR VERTICAL INTEGRITY MONITORING

(75) Inventors: Patrick Y. Hwang, Marion, IA (US); R. Grover Brown, Clear Lake, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 895 days.

(21) Appl. No.: 11/804,830

(22) Filed: May 21, 2007

(51) Int. Cl.
*G01S 19/20* (2010.01)
*G01S 19/48* (2010.01)
*H04W 4/00* (2009.01)
*G01C 21/00* (2006.01)

(52) U.S. Cl. ... 342/357.58; 701/214; 701/9; 342/357.31; 342/358; 455/427

(58) Field of Classification Search ............... 701/214, 701/3, 213, 215, 200, 207, 211, 220, 221, 701/1, 9, 14, 17, 210, 218, 219; 342/357.31, 342/358; 73/178 T; 455/12.1, 427, 456.1; 340/970, 990, 995
See application file for complete search history.

(56) References Cited

U.S. PATENT DOCUMENTS

| | | | | |
|---|---|---|---|---|
| 5,600,329 | A * | 2/1997 | Brenner | 342/357.03 |
| 6,377,892 | B1 * | 4/2002 | Johnson et al. | 701/213 |
| 7,272,472 | B1 * | 9/2007 | McElreath | 701/3 |
| 7,783,425 | B1 * | 8/2010 | Hwang et al. | 701/214 |
| 2002/0109628 | A1 * | 8/2002 | Diesel | 342/357.14 |
| 2005/0052319 | A1 * | 3/2005 | Hatch et al. | 342/357.02 |

OTHER PUBLICATIONS

RAIM FDE Revisited : A new Breakthrough In Availability Performance With NIORAIM ( Novel Integrity-Optimized RAIM), by Hwang, Patrick; Brown, Grover; Revised Apr. 2006.*
RAIM FDE Revisited : A new Breakthrough In Availability Performance With NIORAIM ( Novel Integrity-Optimized RAIM), by Hwang, Patrick; Brown, Grover; Proceedings of the 2005 National Technical Meeting of the Institute of Navigation, San Diego , CA, Jan. 24-26, 2005, pp. 654-665.*
Lee et al, "GBS and Galileo with RAIM or WAAS for Vertically Guided Approaches," ION GNSS 18th International Technical Meeting, pp. 1801-1825 (Sep. 2005).
Brown, R. Grover, "A Baseline GPS RAIM Scheme and a Note on the Equivalence of Three RAIM Methods", Navigation: *Journal of The Institute of Navigation*, vol. 39, No. 3, 1992, (pp. 101-116).
Brown et al., "GPS RAIM: Calculation of Threshold and Protection Radius Using Chi-Square Methods_A Geometric Approach", Invited Paper, Submitted Feb. 1997, Revised Sep. 1997, (pp. 155-178).
Hwang, Patrick Y., "Applying NIORAIM to the Solution Separation Method for Inertially-Aided Aircraft Autonomous Integrity Monitoring", undated, (8 pages).

(Continued)

*Primary Examiner* — Jack Keith
*Assistant Examiner* — Muhammad Shafi
(74) *Attorney, Agent, or Firm* — Matthew J. Evans; Daniel M. Barbieri (57) ABSTRACT

A vertical integrity monitoring method and system are described. The vertical integrity monitoring method includes determining a noise sigma ratio parameter. The method also includes determining two vertical protection limit slopes and an associated covariance matrix. The method further includes determining a vertical integrity limit and set of weights based on the VPL slopes, covariance and the parameter; and applying the set of weights based on the parameter to calculate a vertical solution. An integrity monitoring system may have hardware and/or software embodying the one or more methods described.

5 Claims, 11 Drawing Sheets

OTHER PUBLICATIONS

Hwang, et al., "RAIM FDE Revisited: A New Breakthrough in Availability Performance With NIORAIM (Novel Integrity-Optimized RAIM)", undated, (12 pages).

Hwang et al., "RAIM FDE Revisited: A New Breakthrough In Availability Performance With NIORAIM (Novel Integrity-Optimized RAIM)", undated (11 pages).

Ober, P.B., "Position Domain Integrity Assessment", *ION GPS 2000*, Sep. 19-22, 2000, (pp. 1948-1956).

Ober, P.B., "Towards High Integrity Positioning", *ION GPS '99*, Sep. 14-17, 1999, (pp. 2113-2120).

Hwang, et al, "RAIM FDE Revisited: A New Breakthrough in Availability Performance with NIORAIM (Novel Integrity-Optimized RAIM)," Journal of the Institute of Navigation, vol. 53, No. 1 (Spring 2006). 14 pgs.

U.S. Appl. No. 11/170,660, filed Jun. 29, 2005, entitled "Integrity-Optimized Receiver Autonomous Integrity Monitoring (RAIM)."

U.S. Appl. No. 11/170,665, filed Jun. 29, 2005, entitled "Integrity-Optimized Solution Separation Method For Inertially-Aided Aircraft Autonomous Integrity Monitoring."

\* cited by examiner

| λ | α | VIL |
|---|---|---|
| 1.000 | 1.000 | 5.9669 |
| 0.909 | 0.945 | 6.2674 |
| 0.833 | 0.899 | 6.5803 |
| 0.769 | 0.858 | 6.9016 |
| 0.714 | 0.823 | 7.2304 |
| 0.667 | 0.792 | 7.5644 |
| 0.625 | 0.764 | 7.9038 |
| 0.588 | 0.739 | 8.2474 |
| 0.556 | 0.718 | 8.5952 |
| 0.526 | 0.698 | 8.9462 |
| 0.500 | 0.681 | 9.2994 |
| 0.476 | 0.665 | 9.6557 |
| 0.455 | 0.650 | 10.0141 |
| 0.435 | 0.637 | 10.3747 |
| 0.417 | 0.625 | 10.7358 |
| 0.400 | 0.614 | 11.1001 |
| 0.385 | 0.604 | 11.4649 |
| 0.370 | 0.594 | 11.8307 |
| 0.357 | 0.585 | 12.1977 |
| 0.345 | 0.577 | 12.5657 |
| 0.333 | 0.570 | 12.9347 |
| 0.323 | 0.562 | 13.3059 |
| 0.313 | 0.556 | 13.6760 |
| 0.303 | 0.550 | 14.0472 |
| 0.294 | 0.544 | 14.4194 |
| 0.286 | 0.539 | 14.7927 |
| 0.278 | 0.534 | 15.1660 |
| 0.270 | 0.529 | 15.5393 |
| 0.263 | 0.524 | 15.9136 |
| 0.256 | 0.520 | 16.2880 |
| 0.250 | 0.516 | 16.6634 |
| 0.244 | 0.512 | 17.0388 |
| 0.238 | 0.509 | 17.4142 |
| 0.233 | 0.505 | 17.7912 |
| 0.227 | 0.501 | 18.1671 |
| 0.222 | 0.499 | 18.5447 |
| 0.217 | 0.496 | 18.9222 |
| 0.213 | 0.493 | 19.2997 |
| 0.208 | 0.490 | 19.6773 |
| 0.204 | 0.487 | 20.0548 |
| 0.200 | 0.485 | 20.4323 |

INTEGRITY-OPTIMIZED RECEIVER AUTONOMOUS INTEGRITY MONITORING (RAIM) FOR VERTICAL INTEGRITY MONITORING

CROSS-REFERENCE TO RELATED PATENT APPLICATIONS

This application is related to U.S. patent application Ser. No. 11/170,665 entitled Integrity-Optimized Solution Separation Method for Inertially-Aided Aircraft Autonomous Integrity Monitoring, filed on Jun. 29, 2005 incorporated by reference in its entirety. This application is also related to U.S. patent application Ser. No. 11/170,660 entitled Integrity-Optimized Receiver Autonomous Integrity Monitoring (RAIM), filed on Jun. 29, 2005 incorporated by reference in its entirety.

BACKGROUND

A major shortcoming of Receiver Autonomous Integrity Monitoring (RAIM) Fault Detection and Exclusion (FDE) is widely recognized to be its occasional lack of availability, in the sense that the integrity level it can protect in any given situation cannot always be smaller than the required alert limit for a given flight operation. Ever since the RAIM FDE algorithms were developed, accepted and published more than ten years ago, the system availability has been bound, by and large, to the limitations of its monitoring mechanism to be able to detect and exclude a single measurement fault. There have been many studies made on evaluating the system availability, usually on a global basis, and they have considered various assumptions of constellation size, horizon mask angle, and aiding with baro-altitude, inertial, and additional non-GPS satellites, or even with Loran. In all of these studies, however, the basic shortcomings of RAIM FDE remained essentially bound by its theoretical limits. There has been a recent proposition that departs from conventional assumptions made in the standard RAIM-FDE by better balancing accuracy and integrity levels. This proposition results in the lowering of the horizontal integrity limit for all satellite measurement geometries, thereby improving system availability in the process.

More recently as disclosed in the incorporated patent applications a methodology called Novel Integrity Optimized RAIM (NIORAIM) had been used to reduce the protection or integrity limit for a given GPS satellite geometry. This method takes in, as its inputs, all the raw pseudorange measurements of a GPS receiver, determines the proper set of weights on each measurement to intentionally form a suboptimal position solution that would then has the best (lowest) protection limit possible for integrity purposes. The algorithm was designed for integrity assurance of the horizontal position with the idea that it can also be further generalized to other parameters. The NIORAIM computational algorithm is more complex than the standard form of RAIM and requires a four-dimensional lookup table to reduce its real-time processing burden.

There has been more recent interest placed on assuring integrity for vertical positioning applications for aircraft approach into airports, and there is potential to use Galileo satellites to augment the GPS constellation to produce acceptable vertical protection limits for such operations. An anticipated requirement by the FAA is to segment GPS and Galileo solutions. An advantage this segmentation has is the allowance for multiple faults to occur within one system.

Accordingly, there is a need for NIORAIM principles to be applied to the case of multiple segmented position solutions. There is also a need to simplify computations in such a process.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a vertical integrity monitoring method. The vertical integrity monitoring method includes determining a noise sigma ratio parameter. The method also includes determining two vertical protection limit (VPL) slopes and an associated covariance matrix. The method further includes determining a vertical integrity limit and set of weights based on the VPL slopes, covariance and the parameter; and applying the set of weights based on the parameter to calculate a vertical solution.

What is also provided is an integrity monitoring system for an aircraft. The integrity monitoring system includes a noise parameter generation subsystem, determining a noise ratio sigma parameter relating to two independent position measurements. The system also includes a slope determination subsystem configured to determine two vertical protection limit slopes and an associated covariance matrix. The system further includes a vertical integrity limit (VIL) subsystem configured determine a vertical integrity limit and set of weights based on the VPL slopes, covariance and the parameter and a vertical solution subsystem configured to apply the set of weights based on the parameter to calculate a vertical solution.

Further, what is provided is an integrity monitoring system. The integrity monitoring system includes a means for determining a noise sigma ratio parameter. The system also includes a means for determining two vertical protection limit slopes and an associated covariance matrix. The system also includes a means for determining a vertical integrity limit and set of weights based on the VPL slopes, covariance and the parameter. Further, the system includes a means for applying the set of weights based on the parameter to calculate a vertical solution.

More particularly, what is provided is a navigation vertical integrity monitoring method which is applicable when there are two independent vertical position measurements available for comparison. The method follows NIORAIM principles in that the system optimizes its vertical integrity limit (VIL), in contrast to rms position error, and the monitoring scheme is based on parity-space methods as applied to a two-measurement situation. In this special situation, the test statistic (parity vector) and the position error are both scalars with sign (not just magnitudes as in NIORAIM). This greatly simplifies the VIL computation and the associated VIL lookup table considerably.

What is also provided is a method where the simple difference of the two independent position measurements modified by a scale factor is the test statistic that determines which hypothesis (fault is present or absent) is true. The scale factor needed to achieve the specified false alarm rate is determined using the ratio of the measurement noise sigmas, which is a key parameter of the integrity monitoring system. Further, the monitoring system also involves the calculation of a special 2×2 weight matrix that is used in the weighted-least-squares calculation of the position estimate. A method is provided for determining the correct weighting which achieves the smallest VIL, based on calculating the VPL slopes for each of the two independent position measurements and an associated covariance matrix.

What is further provided is a method for preparing a simple lookup table which gives the smallest VIL that can be achieved by using the appropriate weight factor in the weighted least squares formula. This lookup table has the noise ratio parameter as its sole input, and it provides two outputs: the VIL and the corresponding optimum weighting factor. (For the navigation system to be considered "available", the output VIL must be smaller than the required operational alert limit in order.)

What is still further provided are aircraft monitoring systems embodying the described methods.

Alternative examples and other exemplary embodiments may also be provided which relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Receiver autonomous integrity monitoring of a position solution requires two essential computations: 1) One computation involves using real measurement data from receiver systems to determine if the information is consistent based on prior statistics. If the information is not consistent, this is an indication that there is fault present and an alert is issued. Otherwise, the system continues with the monitoring process. 2) The second computation determines the integrity limit which indicates the bound that the solution error can grow before it is detected. For a system to be declared "operationally available", this integrity limit must be no larger than the required specification (sometimes called the "alert limit") that is based on operational considerations.

If NIORAIM principles are applied to the problem of multiple segmented position solutions, a simplification arises from a reduction of the solution space from 2-D (horizontal) to 1-D (vertical) and there is a corresponding reduction of inputs from the number of satellites (providing raw pseudoranges) to the vertical solutions from each of two constellations. This results in a simplification of the NIORAIM algorithm as applied to such a problem.

For a background on NIORAIM, FIGS. 1-4 provide a graphical depiction of the sensitivity relationship between the detection test and the position error for a fault on each and every satellite. In this relationship, the higher the slope, the larger the position error will be when the fault is discovered in the detection test. In conventional RAIM that involves an optimal least-squares position solution, there is generally one satellite that is the most sensitive (highest slope) and it ends up dictating the protection limit (see FIG. 1). With NIORAIM, the objective is to unevenly weight the various measurements such that the slopes are nearly equal (see FIG. 2). In doing so, the most sensitive one will also end up being lower than the most sensitive one in the conventional RAIM case.

Figure 1:
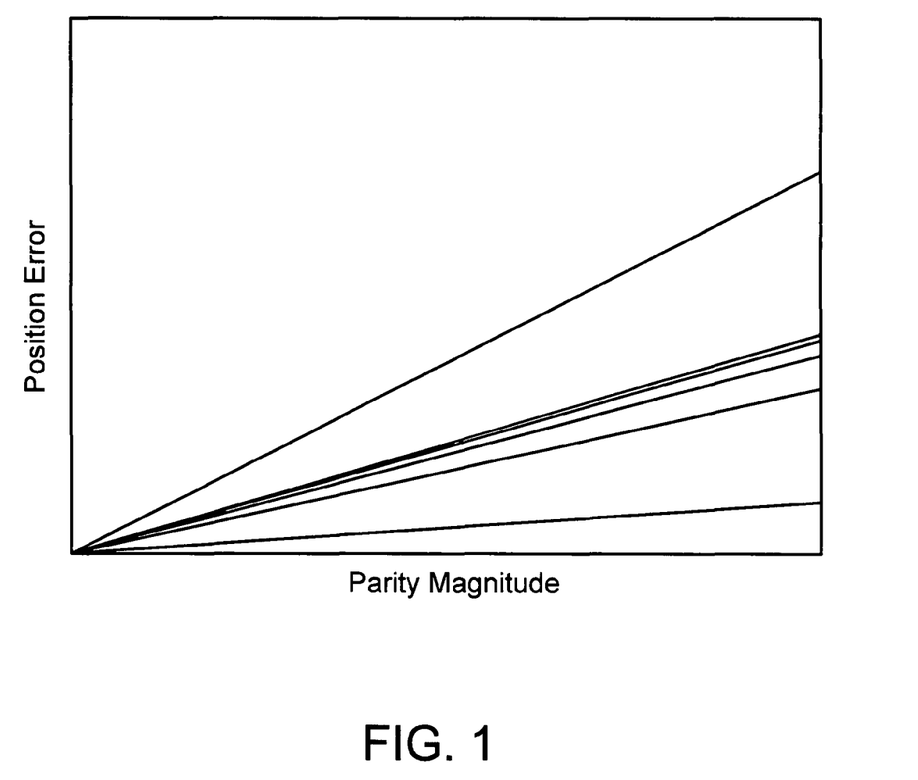
FIG. 1 is an exemplary graph of slopes for a six satellite example with uniform weights.
Figure 2:
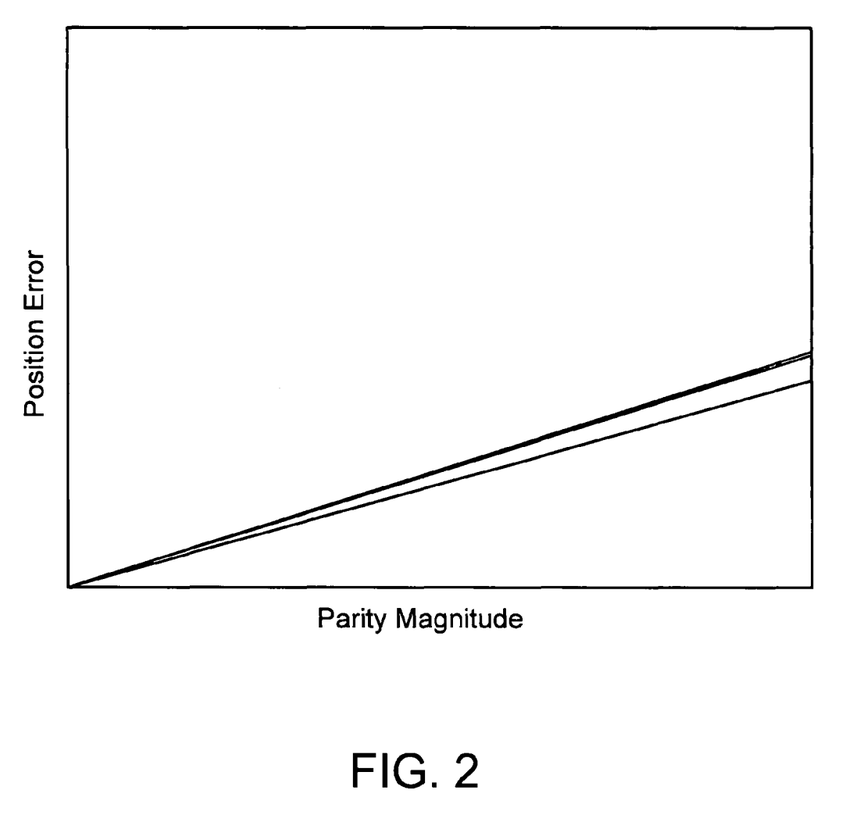
FIG. 2 is an exemplary graph of slopes for a six satellite example with non-uniform weights.
Figure 3:
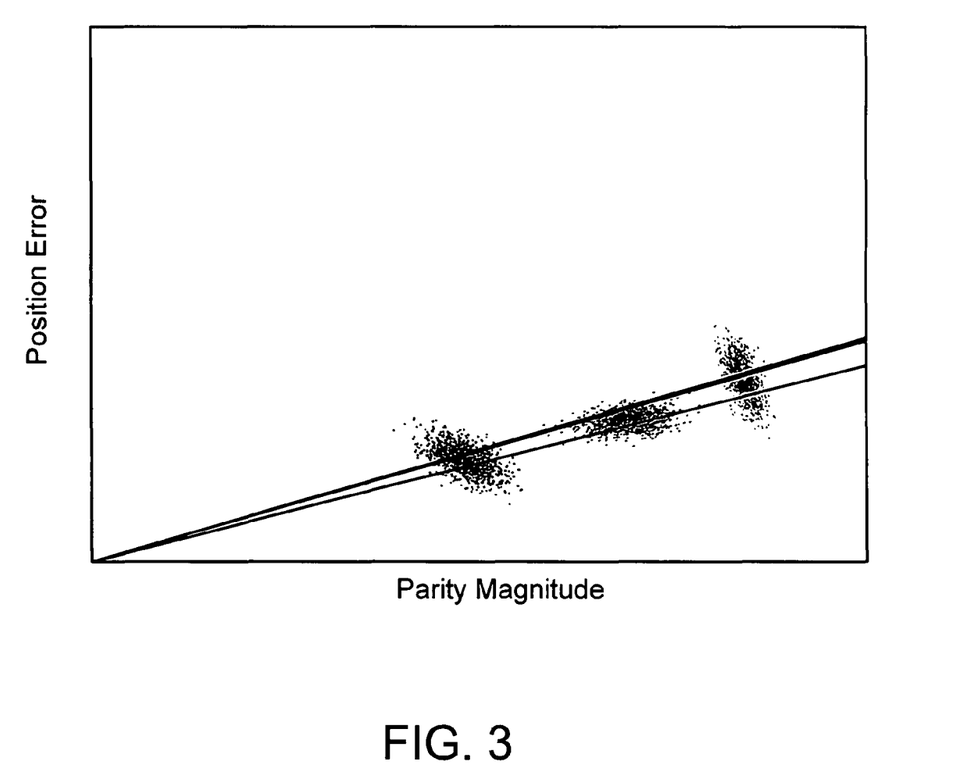
FIG. 3 is an exemplary graph of noise distributions that are different for each fault.

In the slope graphs shown in FIGS. 1 and 2, the vertical axis represents the magnitude of the two-dimensional horizontal error and the horizontal axis represents the magnitude of a test vector (called a parity vector) that can be multidimensional as well. These "magnitude" operations make this graphical space non-linear and tend to distort the noisy data scatter as it moves along the slope lines. These distortions have the effect of varying the scatter distributions for different satellite faults, thereby greatly complicating the problem of computing the protection limit and finding the best weights for minimizing that protection limit (see FIG. 3).

Figure 4:
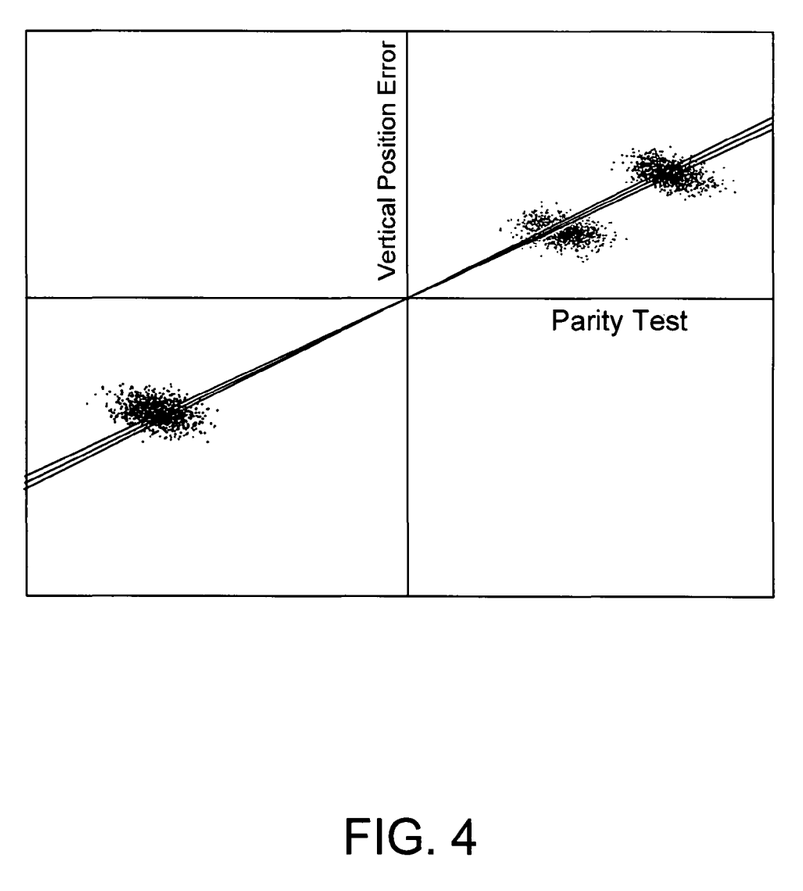
FIG. 4 is an exemplary graph of noise distributions that are identical in the linear space for vertical position and the scalar parity test.

However, in the vertical integrity monitoring problem for a cross-compare between two solutions, the slope graph involves a scalar in the vertical axis (which is simply vertical position error) and another scalar in the horizontal axis (which is the parity test statistic) (see FIG. 4). Since there is no "magnitude" operation involved, this graphical space remains linear and the "sign" can be retained in both the parity test statistic and the vertical position error. The entire problem can be reduced into deriving the Vertical Integrity Limit (VIL) through a one-dimensional lookup table. The input to the table is simply the ratio of the error variances of the respective vertical solutions; the output of the table is the Vertical Integrity Limit (VIL) and an associated weighting parameter.

In accordance with an exemplary embodiment, a general procedure for fault testing and computing vertical integrity limit for the two-solution problem may be embodied in the following procedures:

Step 1:

The Rudimentary Measurement Equation may be given as:

$$\begin{bmatrix} z_1 \\ z_2 \end{bmatrix} = \begin{bmatrix} 1 \\ 1 \end{bmatrix} x + \begin{bmatrix} \varepsilon_1 \\ \varepsilon_2 \end{bmatrix} + \begin{bmatrix} b_1 \\ b_2 \end{bmatrix} \qquad (1)$$

where in the usual no-fault cases, $b_1=0$ and $b_2=0$. When a rare fault occurs, either $b_1 \neq 0$ or $b_2 \neq 0$. However, assume the probability of both events happening simultaneously, $b_1 \neq 0$ and $b_2 \neq 0$, is very unlikely.

In Eq. (1), the vector of measurements $z_1$ and $z_2$, is directly related to the true state x, which is the vertical state to be estimated. These measurements are corrupted by random noises, $\varepsilon_1$ and $\varepsilon_2$, with independent and unbiased gaussian distributions of variances $\sigma_1$ and $\sigma_2$. In real life, $z_1$ and $z_2$ are vertical solutions that come from two separate systems such as GPS and Galileo. The noise terms, $\varepsilon_1$ and $\varepsilon_2$, and the bias terms, $b_1$ and $b_2$, would all remain unknown to the user.

Step 2:

Standard parity space methods generally assume equal noise sigmas (standard deviation) for convenience. To pre-condition Eq. (1) such that the noise sigmas are equal, one of the two measurements is chosen to be the "reference" and the noise of the other measurement is equalized to that of the "reference". Suppose, in this case, that $z_2$ is the reference measurement and the equation is pre-multiplied across with the appropriate matrix:

$$\underbrace{\begin{bmatrix} \frac{\sigma_2}{\sigma_1} & 0 \\ 0 & 1 \end{bmatrix} \begin{bmatrix} z_1 \\ z_2 \end{bmatrix}}_{z'} = \underbrace{\begin{bmatrix} \frac{\sigma_2}{\sigma_1} & 0 \\ 0 & 1 \end{bmatrix} \begin{bmatrix} 1 \\ 1 \end{bmatrix}}_{H'} x + \underbrace{\begin{bmatrix} \frac{\sigma_2}{\sigma_1} & 0 \\ 0 & 1 \end{bmatrix} \begin{bmatrix} \varepsilon_1 \\ \varepsilon_2 \end{bmatrix}}_{\varepsilon'} + \underbrace{\begin{bmatrix} \frac{\sigma_2}{\sigma_1} & 0 \\ 0 & 1 \end{bmatrix} \begin{bmatrix} b_1 \\ b_2 \end{bmatrix}}_{b'} \qquad (2)$$

The ratio of noise sigmas may be defined as a new parameter $\lambda$. Then, the new measurement equation becomes:

$$\underbrace{\begin{bmatrix} \lambda z_1 \\ z_2 \end{bmatrix}}_{z'} = \underbrace{\begin{bmatrix} \lambda \\ 1 \end{bmatrix}}_{H'} x + \underbrace{\begin{bmatrix} \lambda \varepsilon_1 \\ \varepsilon_2 \end{bmatrix}}_{\varepsilon'} + \underbrace{\begin{bmatrix} \lambda b_1 \\ b_2 \end{bmatrix}}_{b'} \qquad (3)$$

Step 3:

For simplification of the computation, the "reference" noise sigma is normalized such that $\sigma_2=1$. This "normalization" allows for a standard computation of the VIL, made either online or based on a Lookup Table, and the true VIL, e.g. in meters, is then obtained by multiplying the normalized VIL with the true value of $\sigma_2$.

Step 4:

The parity value is formed simply by $$p = Pz' = P\varepsilon' \qquad (4)$$

The parity transformation matrix P is given by:

$$P = \begin{bmatrix} \frac{-1}{\sqrt{1+\lambda^2}} & \frac{\lambda}{\sqrt{1+\lambda^2}} \end{bmatrix} \qquad (5)$$

Therefore, the parity test statistic is simply the difference between the "raw" measurements $z_1$ and $z_2$, scaled by a term that derives from the "normalization".

$$p = \begin{bmatrix} \frac{-1}{\sqrt{1+\lambda^2}} & \frac{\lambda}{\sqrt{1+\lambda^2}} \end{bmatrix} \begin{bmatrix} \lambda z_1 \\ z_2 \end{bmatrix} \qquad (6)$$

$$= \frac{\lambda}{\sqrt{1+\lambda^2}}(z_2 - z_1)$$

The parity value p is the test statistic and note that it is scalar and includes a sign.

Step 5:

The weighting matrix w that transforms the solution into one with the lowest Vertical Integrity Limit (VIL) is represented in terms of $\lambda$ and scaled with an unknown scaling parameter $\alpha$. This parameter $\alpha$ provides a new degree of freedom for varying the weighting matrix independently of $\lambda$ used for preconditioning the measurements in the previous steps. Next, search for the best $\alpha$ that minimizes the VIL. This weighting matrix is simply given by $$w = \begin{bmatrix} 1 & 0 \\ 0 & \alpha\lambda \end{bmatrix} \qquad (7)$$

The solution that is protected by this VIL is given by (written in terms of H' and z' modified in Step 2):

$$\hat{x}_{WLS} = [(wH')^T wH']^{-1}(wH')^T wz' = \frac{1}{1+\alpha^2}z_1 + \frac{\alpha^2}{1+\alpha^2}z_2 \qquad (8)$$

Step 6:

To properly compute the VIL associated with this choice of w, derive two variables, $Slope_1$ and $Slope_2$, associated with which of the two measurements the fault occurs in. The covariance matrix C of the noise distribution in the Parity-Error (P-E) space (note that the Error in this space refers to the Vertical Position Error) is the same for the fault occurring in either measurement.

$$Slope_1 = \frac{-\sqrt{1+\lambda^2}}{\lambda(1+\alpha^2)} \qquad (9)$$

$$Slope_2 = \frac{\alpha^2\sqrt{1+\lambda^2}}{\lambda(1+\alpha^2)}$$

$$C = \begin{bmatrix} 1 & \frac{\alpha^2\lambda^2 - 1}{(1+\alpha^2)\lambda\sqrt{1+\lambda^2}} \\ \frac{\alpha^2\lambda^2 - 1}{(1+\alpha^2)\lambda\sqrt{1+\lambda^2}} & \frac{1+\alpha^4\lambda^2}{\lambda^2(1+\alpha^2)^2} \end{bmatrix} \qquad (10)$$

Figure 5:
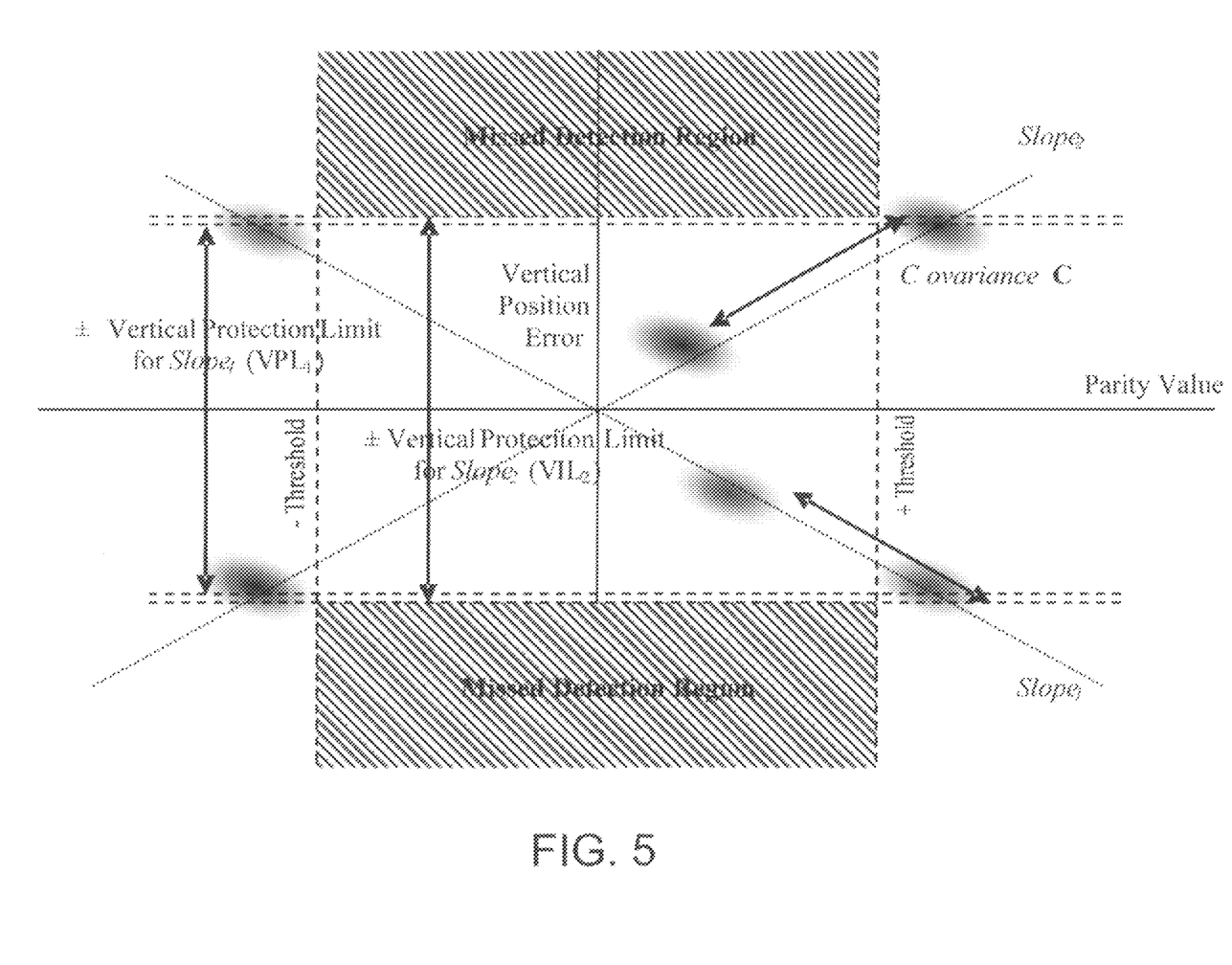
FIG. 5 is an exemplary graph of missed detection probability and vertical protection limits, for given threshold and Slope i and Covariance C.

Step 7:

Finally, compute the Vertical Protection Limit associated with each measurement, $VPL_1$ and $VPL_2$, in accordance with FIG. 5.

Given the Slope, either $Slope_1$ or $Slope_2$, and the Covariance matrix C, the Vertical Protection Limit ($VPL_i$) is defined as the lowest value permitted by integration of the applicable Gaussian probability density function within the indicated Missed Detection Region. This, in turn, must be equal to or less than the allowable Missed Detection Probability for the given threshold setting. The threshold setting is made according to the specified false alert probability. For a specific choice of $\alpha$, one gets a $VPL_1$ and $VPL_2$ that are generally not equal. However, the VIL is always a conservative measure, and thus it would take on the larger of the two values, i.e. VIL=max {VPL$_1$, VPL$_2$}. However, for a given value of $\lambda$, there is one particular value of $\alpha$ for which VPL$_1$=VPL$_2$ and this choice would also result in a minimum value for the VIL (this is a classical min-max optimization problem).

This VIL determination involves computing probabilities via numerical integration and doing so iteratively as the noise distribution scatter is shifted along the Slope, all the while ensuring that the Missed Detection Probability is evaluated in the worst case situation. The computational process for VIL may be made online for the given Slope and Covariance C, and the associated false alert and missed detection probability requirements, or it may be made from an appropriate Lookup Table based on interpolation between cardinal points of pre-computed values. Note that this Lookup Table only has one parameter, namely $\lambda$, for its input and is, therefore, a one-dimensional Lookup Table. This table yields a corresponding value for the optimum $\alpha$ as well as the resultant VIL. Note that the optimum $\alpha$ would then be used together with $\lambda$ to form the weighting matrix w (Equation 7) and used in the weighted least squares estimation equation accordingly (Equation 8).

Figure 6:
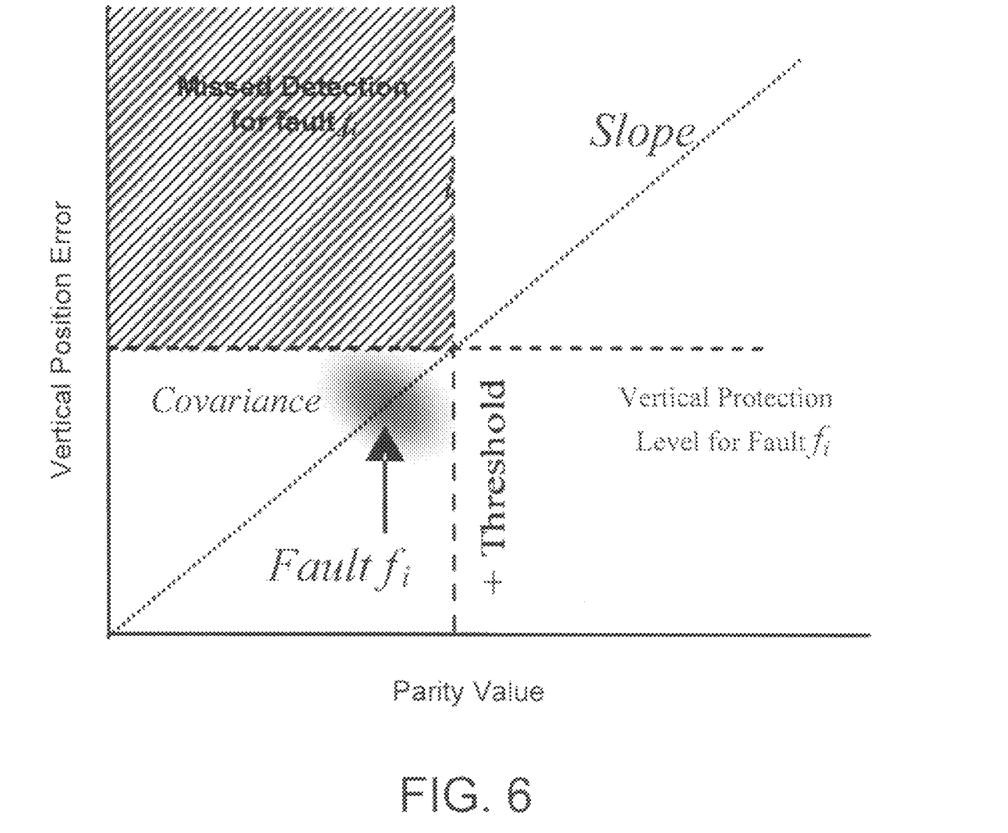
FIG. 6 is an exemplary graph of vertical protection level increases as fault bias grows up to a maximal point.

Once the Slope and the Covariance matrix C are specified, recognize that for a given fault bias, the bivariate Gaussian probability density would be located somewhere along the Slope line, its mean being centered precisely on it (FIG. 6).

At any particular point along that Slope line, a Vertical Protection Level associated with that point may be computed, by doing a numerical integration to determine the volume under the density function. That Vertical Protection Level is chosen such that the volume integrated in the missed detection region (above the vertical protection level and within the threshold bounds) is equal to or less than the allowable missed detection probability.

When the fault bias starts out small, the corresponding Vertical Protection Level is also relatively small. As the fault bias grows in size, the Vertical Protection Level also increases until it reaches a maximum, at which point the corresponding bias is considered to be the worst case bias (see FIG. 7). Following this, if the bias grows even larger, the Vertical Protection Level actually drops. The maximum peak of the Vertical Protection Level is then deemed to be the Vertical Protection Limit (VPL$_i$) for the associated Slope$_i$.

Figure 7:
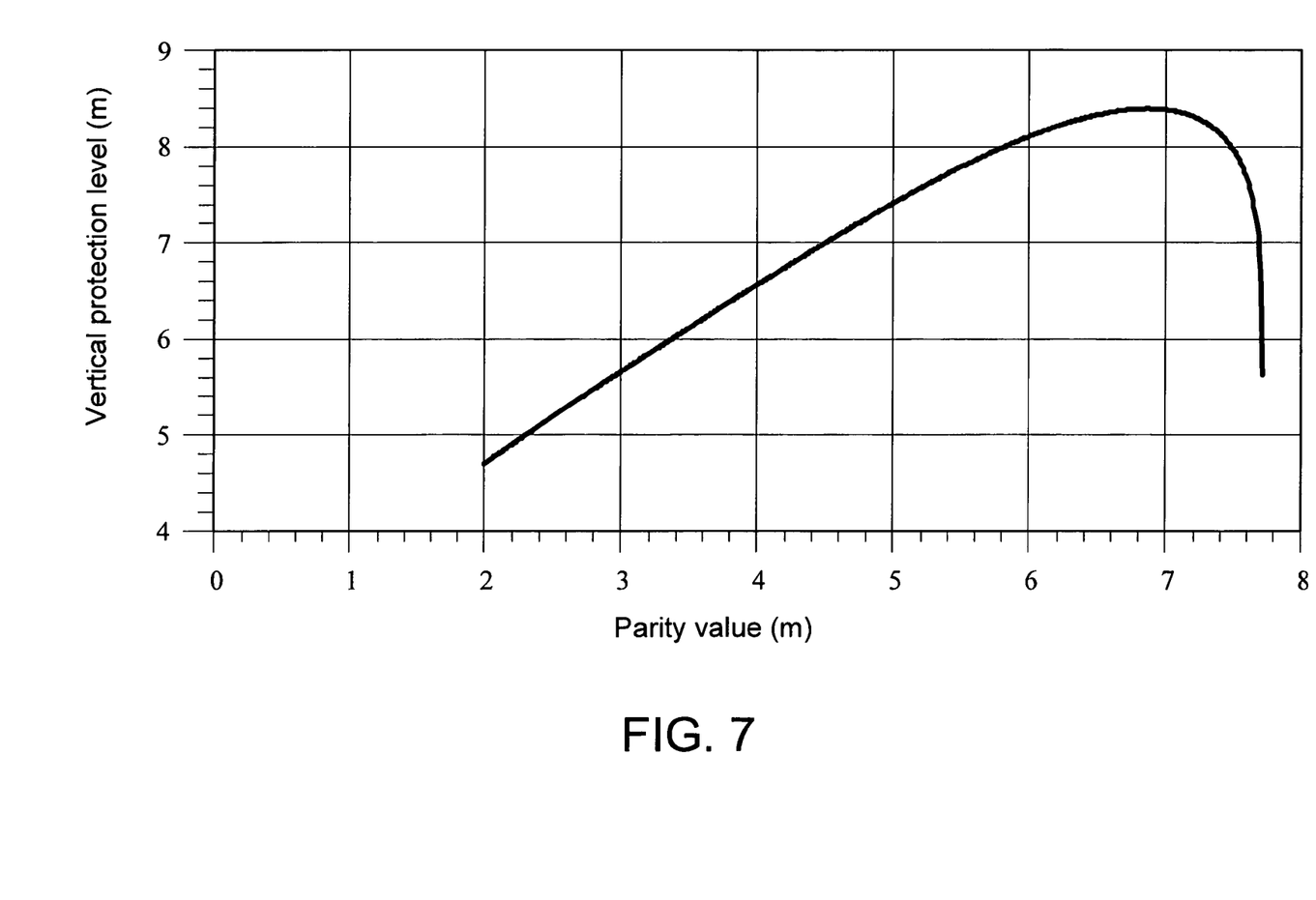
FIG. 7 is an exemplary graph of variation in the vertical protection level as bias changes along Slope 2.
Figure 8:
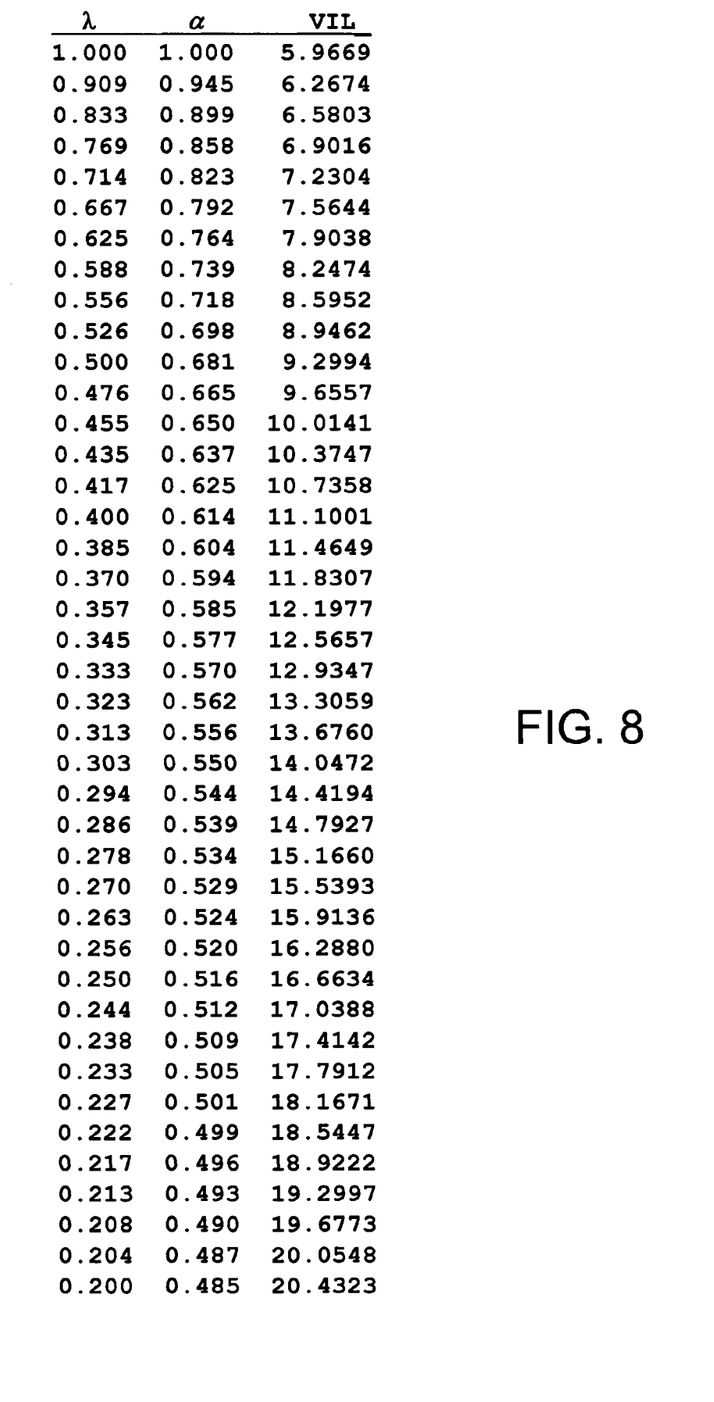
FIG. 8 is an exemplary look-up table.

The profile shown in FIG. 7 actually represents a particular situation (associated with Slope$_2$) for a case where $\sigma_1$=3 m, $\sigma_2$=2 m, and so $\lambda$=⅔. In this particular case, an arbitrary (not optimized) choice of $\alpha$=1 is used. The threshold was chosen to be 4.417 m (representing a false alert rate of $10^{-5}$ per approach) and the allowable missed detection probability was $5 \times 10^{-4}$.

The following parameters of Slope$_2$ and covariance matrix C are given by:

$$\text{Slope}_2 = \frac{\alpha^2\sqrt{1+\lambda^2}}{\lambda(1+\alpha^2)} = \frac{\sqrt{1+\lambda^2}}{2\lambda} = \frac{\sqrt{13}}{4}$$

$$C = \begin{bmatrix} 1 & \frac{\alpha^2\lambda^2 - 1}{(1+\alpha^2)\lambda\sqrt{1+\lambda^2}} \\ \frac{\alpha^2\lambda^2 - 1}{(1+\alpha^2)\lambda\sqrt{1+\lambda^2}} & \frac{1+\alpha^4\lambda^2}{\lambda^2(1+\alpha^2)^2} \end{bmatrix} = \begin{bmatrix} 1 & \frac{-5}{4\sqrt{13}} \\ \frac{-5}{4\sqrt{13}} & \frac{13}{16} \end{bmatrix}$$

The example given above simply illustrates how a Vertical Protection Limit associated with Slope$_2$ (VPL$_2$) is computed for the stated conditions. VPL$_1$ is computed in a similar fashion. For the given $\sigma_1$ and $\sigma_2$, the Lookup Table yields the optimum value of $\alpha$ that results in VPL$_1$=VPL$_2$. Under these conditions, the VIL is equal to either VPL$_1$ or VPL$_2$. To compute a Lookup Table, various ratios of $\lambda=\sigma_2/\sigma_1$ are formed and for each $\lambda$, a search for the optimum $\alpha$ is made. This search is a univariate optimization problem that can be easily made with a procedure such as the Method of Bisection.

In accordance with exemplary embodiments discussed, it may be important to consider the following characteristics as being unique and different as compared to the previously disclosed NIORAIM scheme:

1. P-E space is linear throughout instead of being restricted to positive values of P(parity) and E(error), i.e. all four quadrants instead of one. As a result, the Missed Detection Probability can be evaluated from exact Gaussian statistics, without any approximation from Chi-Square statistics.
2. The covariance matrix of the error distribution is invariant with the size of the bias or on which measurement a bias fault resides.
3. The computation of the VIL only requires a one-dimensional Lookup Table with the input being a ratio of the noise sigmas.

Although the three characteristics given above are important differences, the disclosure is not limited to these differences. The Two-Solution GPS/Galileo system was used as a convenient example of optimizing the self-checking integrity of the combined system. It is obvious that the same technique could be applied to many other two-solution systems where it is desired to optimize the integrity of the system with respect to the integrity level achieved with cross comparison of solutions or measurements.

Figure 9:
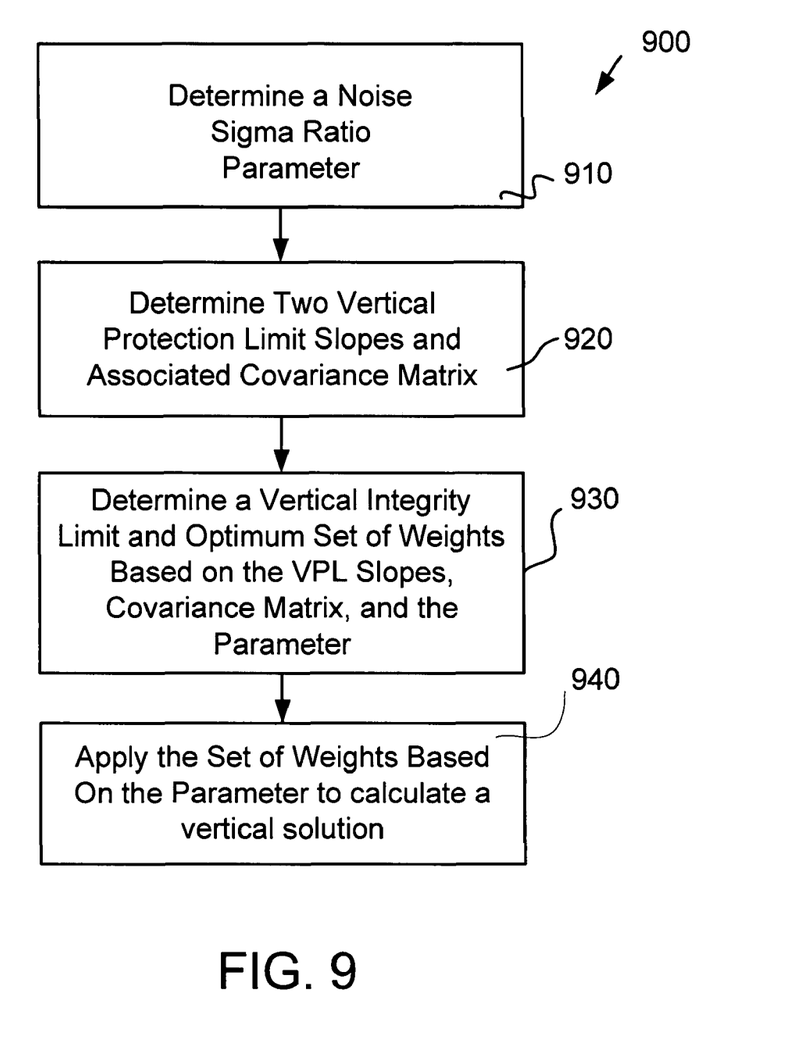
FIG. 9 is an exemplary process diagram for an integrity monitoring method.

In accordance with one exemplary embodiment, a process 900 is depicted in FIG. 9. Process 900 which embodies an integrity monitoring method includes determining a noise sigma ratio parameter (process 910). This noise ratio parameter may be defined as $\lambda$ as given above. Process 900 also includes determining a set of weights based on the parameter and corresponding to a solution with lowest vertical integrity limit (process 920). Process 900 also includes determining two vertical protection limit slopes and an associated covariance matrix (process 920) and determining a vertical integrity limit and a set of weights, based on the VPL slopes, covariance and the parameter (process 930). Further, the set of weights is applied to calculate a vertical solution (process 940); such a solution will be assured to the lowest vertical integrity limit that had been calculated in process 930. Although many methods of making the above computations on line in substantially real-time, one method may include the use of a Lookup Table. Because of the nature of the problem, this may be reduced to a one-dimensional Lookup Table as described above.

Figure 10:
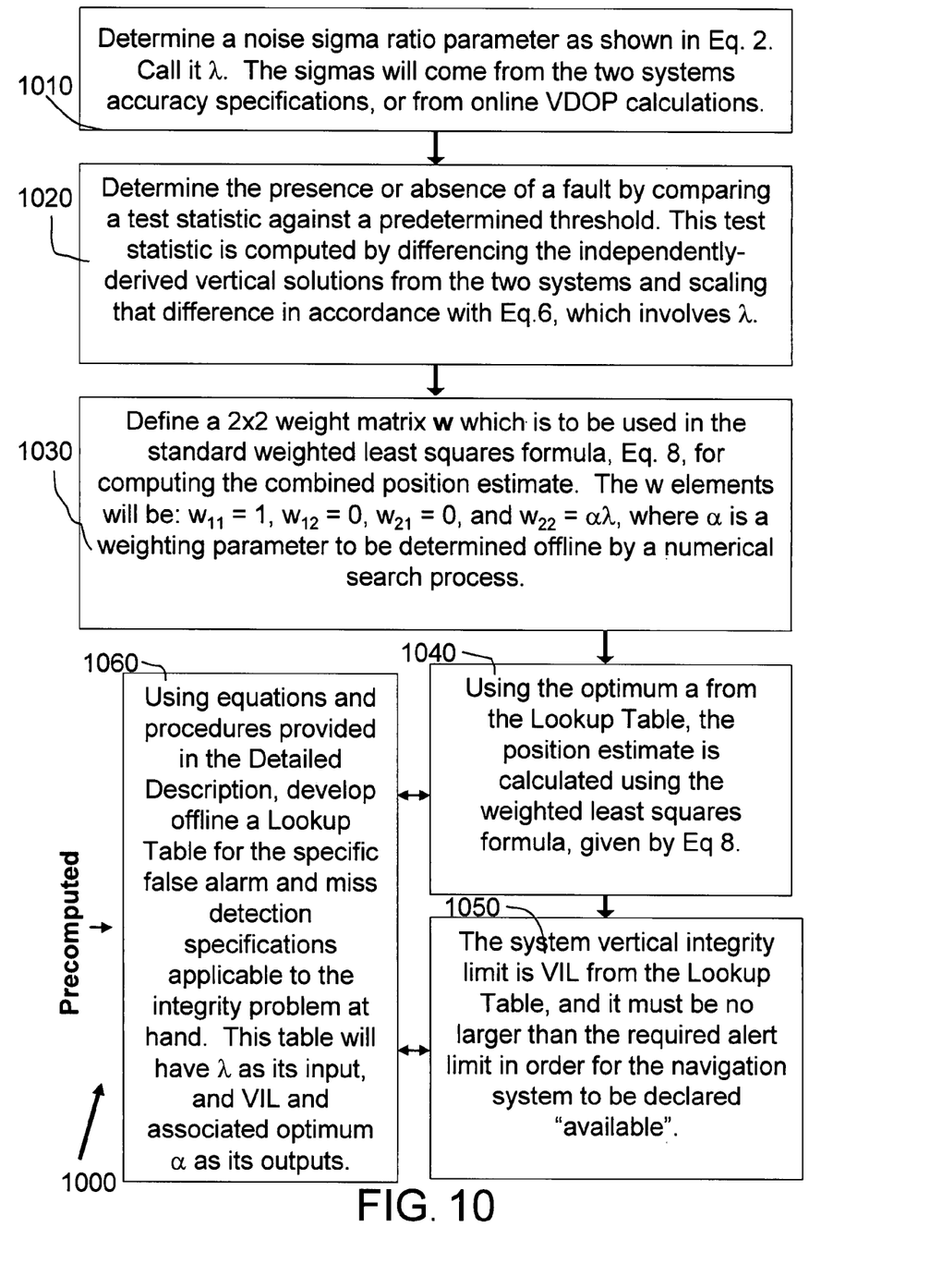
FIG. 10 is an exemplary detailed diagram of the process of FIG. 9
Figure 11:
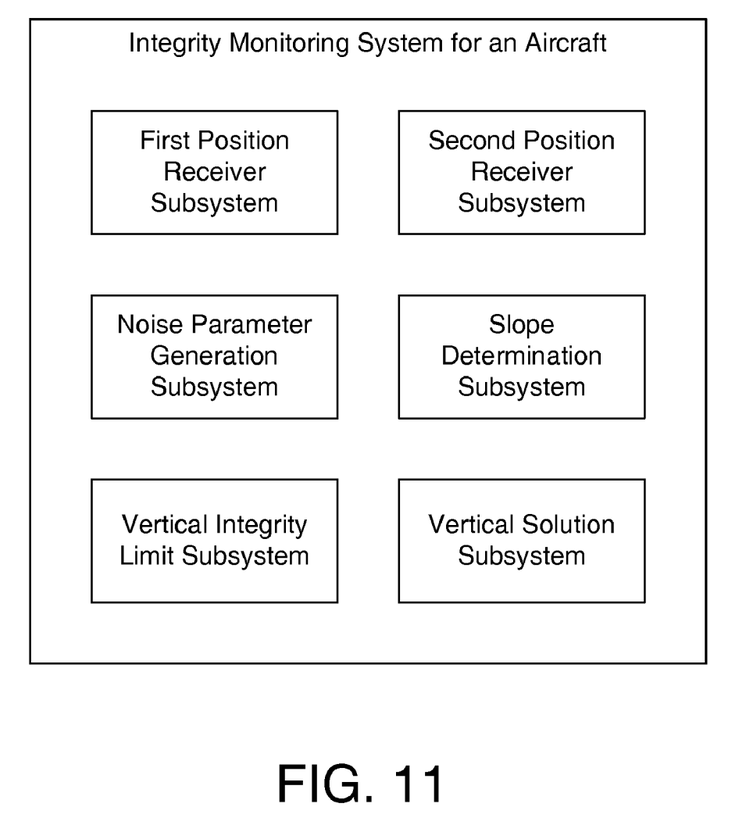
FIG. 11 is a block diagram of an integrity monitoring system for an aircraft.

In accordance with a particular exemplary embodiment, a process 1000 depicted in FIG. 10 may be representative of the integrity monitoring systems and methods described above, although not limited thereto. Process 1000 includes determining a noise sigma ratio parameter as shown in Eq. 2 (process 1010). Call it $\lambda$, for ease of expression. The sigmas may come from the two system's accuracy specifications or from online VDOP calculations. Process 1000 also includes determining the presence or absence of a fault by comparing a test statistic against a predetermined threshold (process 1020). This test statistic may be computed by differencing the independently-derived vertical solutions from the two systems and scaling that difference in accordance with Eq. 6, which involves $\lambda$. Further, process 1000 includes defining a 2×2 weight matrix w which is to be used in the standard weighted least squares formula, Eq. 8 for computing the combined position estimate (process 1030). The w elements will be: $w_{11}=1$, $w_{12}=0$, $w_{21}=0$, and $w_{22}=\alpha\lambda$, where a is a weighting parameter to be determined offline by a numerical search process. Further still process 1000 may include using the optimum a from the Lookup Table. The position estimate may be calculated using the weighted least squares formula, given by Eq 8. Yet further still, process 1000 includes deriving the system vertical integrity limit VIL from the Lookup Table (process 1050). It should be no larger than the required alert limit in order for the navigation system to be declared "available". The Lookup Table may be computed in a predetermined manner offline. For example, using equations and procedures provided in the above description, develop offline a Lookup Table for the specific false alarm and miss detection specifications applicable to the integrity problem at hand (process 1060). This table will have $\lambda$ as its input, and VIL and associated optimum a as its outputs.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

APPENDIX

Derivation of Equations $$H' = \begin{bmatrix} \lambda \\ 1 \end{bmatrix}$$

$$w = \begin{bmatrix} 1 & 0 \\ 0 & \alpha\lambda \end{bmatrix}$$

$$\hat{x}_{WLS} = [(wH')^T wH']^{-1} (wH')^T wz'$$

$$\hat{x}_{WLS} - x = \underbrace{[(wH')^T wH']^{-1} (wH')^T w}_{A_w} \varepsilon'$$

$$A_w = \left\{ \left( \begin{bmatrix} 1 & 0 \\ 0 & \alpha\lambda \end{bmatrix} \begin{bmatrix} \lambda \\ 1 \end{bmatrix} \right)^T \begin{bmatrix} 1 & 0 \\ 0 & \alpha\lambda \end{bmatrix} \begin{bmatrix} \lambda \\ 1 \end{bmatrix} \right\}^{-1}$$

$$\left( \begin{bmatrix} 1 & 0 \\ 0 & \alpha\lambda \end{bmatrix} \begin{bmatrix} \lambda \\ 1 \end{bmatrix} \right)^T = \frac{1}{\lambda^2 + \alpha^2\lambda^2} [\lambda \ \alpha\lambda]$$

$$\text{Slope}_1 = \frac{A_w w \begin{bmatrix} b \\ 0 \end{bmatrix}}{P \begin{bmatrix} b \\ 0 \end{bmatrix}} = \frac{\frac{1}{\lambda^2 + \alpha^2\lambda^2} [\lambda \ \alpha\lambda] \begin{bmatrix} 1 & 0 \\ 0 & \alpha\lambda \end{bmatrix} \begin{bmatrix} b \\ 0 \end{bmatrix}}{\begin{bmatrix} \frac{-1}{\sqrt{1+\lambda^2}} & \frac{\lambda}{\sqrt{1+\lambda^2}} \end{bmatrix} \begin{bmatrix} b \\ 0 \end{bmatrix}} =$$

$$\frac{\frac{b\lambda}{\lambda^2(1+\alpha^2)}}{\frac{-b}{\sqrt{1+\lambda^2}}} = \frac{-\sqrt{1+\lambda^2}}{\lambda(1+\alpha^2)}$$

$$\text{Slope}_2 = \frac{A_w w \begin{bmatrix} 0 \\ b \end{bmatrix}}{P \begin{bmatrix} 0 \\ b \end{bmatrix}} = \frac{\frac{1}{\lambda^2 + \alpha^2\lambda^2} [\lambda \ \alpha\lambda] \begin{bmatrix} 1 & 0 \\ 0 & \alpha\lambda \end{bmatrix} \begin{bmatrix} 0 \\ b \end{bmatrix}}{\begin{bmatrix} \frac{-1}{\sqrt{1+\lambda^2}} & \frac{\lambda}{\sqrt{1+\lambda^2}} \end{bmatrix} \begin{bmatrix} 0 \\ b \end{bmatrix}} =$$

$$\frac{\frac{b\alpha^2\lambda^2}{\lambda^2(1+\alpha^2)}}{\frac{b\lambda}{\sqrt{1+\lambda^2}}} = \frac{\alpha^2\sqrt{1+\lambda^2}}{\lambda(1+\alpha^2)}$$

$$C = \begin{bmatrix} C_{11} & C_{12} \\ C_{12} & C_{22} \end{bmatrix}$$

$$C_{11} = P\varepsilon'(P\varepsilon')^T = P\varepsilon'\varepsilon'^T P^T = PP^T = 1$$

$$C_{22} = A_w w \varepsilon' (A_w w \varepsilon')^T = A_w w \varepsilon' \varepsilon'^T w^T A_w^T =$$

$$\frac{[\lambda \ \alpha\lambda]}{\lambda^2(1+\alpha^2)} \begin{bmatrix} 1 & 0 \\ 0 & \alpha\lambda \end{bmatrix} \begin{bmatrix} 1 & 0 \\ 0 & \alpha\lambda \end{bmatrix} \begin{bmatrix} \lambda \\ \alpha\lambda \end{bmatrix} \frac{1}{\lambda^2(1+\alpha^2)} =$$

$$\frac{1+\alpha^4\lambda^2}{\lambda^2(1+\alpha^2)^2}$$

$$C_{12} = A_w w \varepsilon' (P\varepsilon')^T = A_w w \varepsilon' \varepsilon'^T P^T = \frac{1}{\lambda^2(1+\alpha^2)}$$

$$[\lambda \ \alpha\lambda] \begin{bmatrix} 1 & 0 \\ 0 & \alpha\lambda \end{bmatrix} \begin{bmatrix} \frac{-1}{\sqrt{1+\lambda^2}} \\ \frac{\lambda}{\sqrt{1+\lambda^2}} \end{bmatrix} = \frac{\alpha^2\lambda^2 - 1}{\lambda(1+\alpha^2)\sqrt{1+\lambda^2}}$$

What is claimed is:

1. An integrity monitoring system for an aircraft, comprising:
   receivers for providing two independent position measurements;
   a noise parameter generation subsystem configured to determine a ratio of the noise standard deviations for the two independent position measurements;
   a slope determination subsystem configured to use the ratio of the noise standard deviations and a scaling parameter to determine two vertical protection limit (VPL) slopes and an associated covariance matrix, wherein each of the two VPL slopes are associated with a failure affecting one of the two independent position measurements;
   a vertical integrity limit subsystem configured to determine a vertical integrity limit by analyzing the VPL slopes;
   wherein the vertical integrity limit subsystem is further configured to search for the scaling parameter estimated to minimize the vertical integrity limit using the two VPL slopes and the associated covariance matrix, wherein the scaling parameter represents a non-uniform weighting for the two independent position measurements; and
   a vertical solution subsystem configured to determine if a navigation system for the aircraft is available by determining whether the vertical integrity limit is less than a threshold.

2. The system of claim 1, wherein the covariance matrix is the covariance of the noise distribution in the parity-error (P-E) space.

3. The system of claim 1, wherein results from the slope determination subsystem and the vertical integrity limit subsystem are stored in a one-dimensional lookup table having the ratio of the noise standard deviations for the two independent position measurements as the input and the vertical integrity limit as an output.

4. The system of claim 1, wherein the receivers comprise a first receiver configured to receive a first position from a first positioning system and a second receiver configured to receive a second position from a second positioning system.

5. The system of claim 4, wherein the first positioning system is a GPS system and the second positioning system is another GNSS.

* * * * *